United States Patent [19]

Thompson

[11] Patent Number: 4,605,104

[45] Date of Patent: Aug. 12, 1986

[54] ACTUATOR DEVICE

[75] Inventor: Arnold R. Thompson, Brigham City, Utah

[73] Assignee: Morton Thiokol, Inc., Chicago, Ill.

[21] Appl. No.: 745,821

[22] Filed: Jun. 17, 1985

Related U.S. Application Data

[63] Continuation of Ser. No. 387,898, Jun. 14, 1982, abandoned.

[51] Int. Cl.$^4$ .................. F16D 55/224; F16D 55/228; F16D 65/20
[52] U.S. Cl. .................................. 188/72.4; 188/72.3; 188/72.5; 188/370; 188/216
[58] Field of Search ..................... 188/72.3, 72.4, 72.5, 188/366, 367, 368, 369, 370, 216, 217; 92/248, 249; 267/57.1 R; 264/138

[56] References Cited

U.S. PATENT DOCUMENTS

| | | | |
|---|---|---|---|
| 2,756,844 | 7/1956 | Chamberlain et al. | 188/370 |
| 3,064,768 | 11/1962 | Dotto | 188/370 |
| 3,804,222 | 4/1974 | Szynka | 192/85 AA |
| 3,887,042 | 6/1975 | Ditlinger et al. | 188/370 |
| 3,889,785 | 6/1975 | Hori | 188/72.4 |
| 3,995,723 | 12/1976 | Holcomb, Jr. | 188/370 |
| 4,093,043 | 6/1978 | Smith | 188/72.5 |
| 4,108,508 | 8/1978 | Clinard, Jr. | 267/57.1 R |
| 4,141,950 | 2/1979 | Thompson | 264/138 |
| 4,222,463 | 9/1980 | Domes et al. | 188/216 |
| 4,349,184 | 9/1982 | Peterson et al. | 267/57.1 R |

FOREIGN PATENT DOCUMENTS 2080455  2/1982  United Kingdom ............... 188/72.3

Primary Examiner—Bruce H. Stoner, Jr.
Assistant Examiner—Alvin Oberley
Attorney, Agent, or Firm—Gerald K. White

[57] ABSTRACT

An actuating mechanism is disclosed as particularly useful for a braking assembly, and especially for a disc brake assembly. The mechanism is a device having elastic properties formed from a plurality of layers, or laminae of rigid (metal, hard plastic) and resilient (elastomer, rubber) members bonded together and to the inside of a casing or caliper housing sealing it therein. The casing together with the bonded and sealed actuator therein is threaded into the caliper housing of the brake assembly. Fluid pressure applied to the casing interior activates the mechanism and it yields by flexing axially. An attached brake shoe or pad is operated by the actuator, given an axial displacement and urged against the brake assembly drum or rotor in a braking action. The actuator mechanism returns the shoe or pad to a neutral, non rotor contacting position automatically when the pressure of the fluid in the casing is relieved.

6 Claims, 6 Drawing Figures

U.S. Patent  Aug. 12, 1986  Sheet 1 of 2  4,605,104
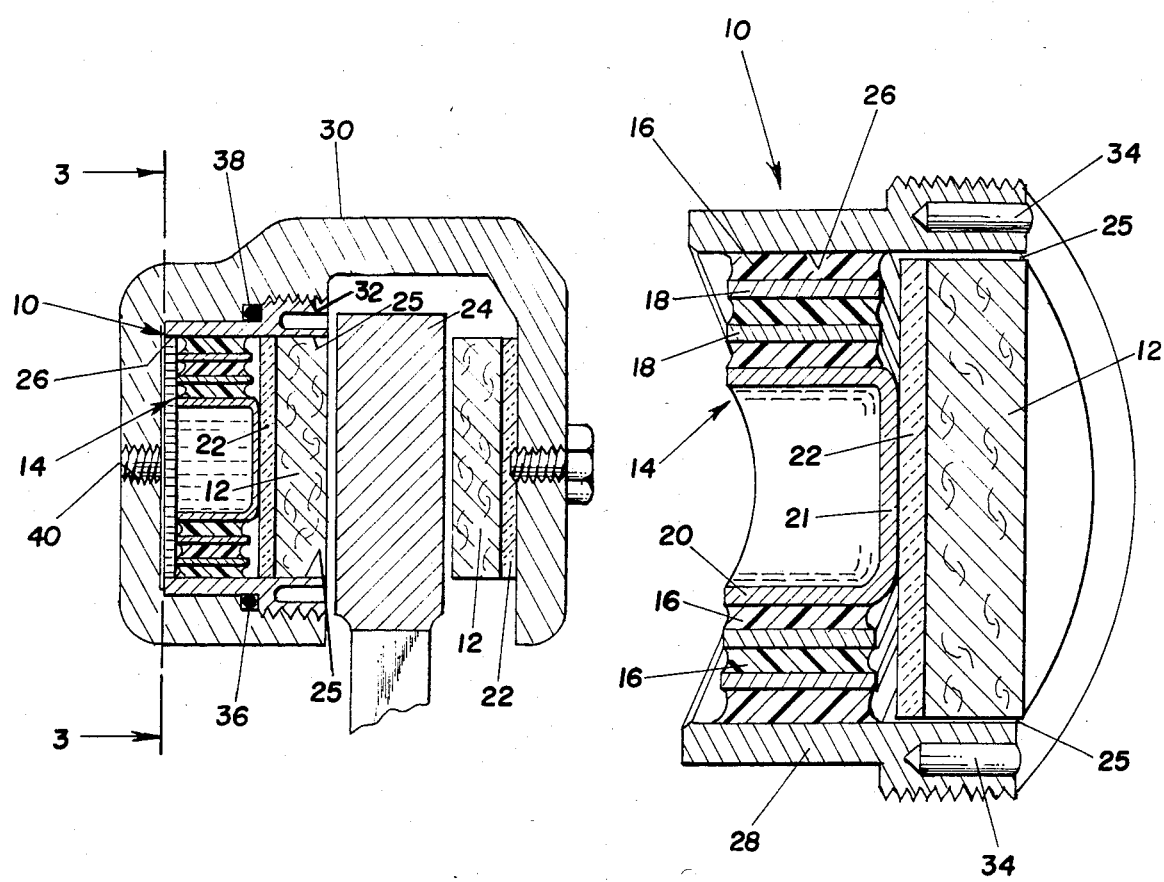
Fig. 1
Fig. 2
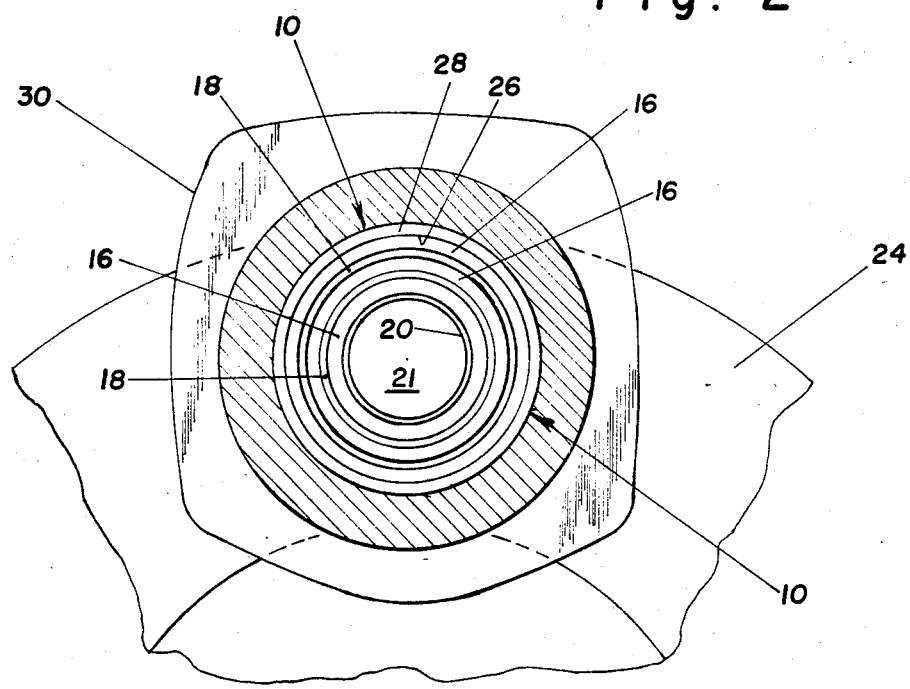
Fig. 3

ACTUATOR DEVICE

This application is a continuation of application Ser. No. 387,898, filed June 14, 1982, now abandoned.

BACKGROUND OF THE INVENTION

1. Field of the Invention

This invention relates to actuation mechanisms used in or with apparatuses, machines, appliances and like devices which when activated result in engagement of a component of the device with another component thereof or of another apparatus, machine or appliance. More particularly, this invention relates to actuator mechanisms used in or with the aforesaid devices as components thereof which possess elastic properties and are so formed that when subjected to axial stress undergo an elastic deformation causing an axial displacement of a movable body component operatively connected to the mechanism thereby effectuating an engagement of the body component with another component of the apparatus, machine or appliance. The actuator, when the stress is removed automatically regains its unstressed form and the displaced body returns to its former position, simultaneously disengaging from the other component.

In a preferred use in a brake assembly of a vehicle, the movable body is the brake pad or shoe of a disc brake which, when displaced by the stressed actuator, frictionally engages the rotating disc of the brake assembly whose rotational motion is to be restrained and applies a braking force thereagainst.

Briefly, this invention utilizes a plurality of rigid and resilient members which are bonded together and formed into an integral unit capable of being retained in a housing of the assembly in sealing relation therein so that when a pressurizing fluid is admitted, the unit undergoes an axial deformation in which the inner members shift axially relative to the outer members of the plurality of members and a displacement of the movable brake pad or shoe connected thereto results.

2. Description of the Prior Art

Actuators and actuation devices in general for creating movements in apparatuses, machines and appliances and their component parts are well known. For example, in a disc brake assembly as mentioned previously, and for which the present invention has especial utility and suitability, hydraulic fluid pressure is used to drive a piston in a cylinder in the brake caliper thereof to urge a friction pad against a brake disc or rotor fixed to the wheels of a vehicle, thereby braking the vehicle. Exemplary patents disclosing this type of actuation device are U.S. Pat. No. 4,274,514 in which a pair of friction pads are forced into engagement with the rotor of a disc brake assembly by hydraulic fluid acting against a piston mounted in the caliper assembly of the brake, and U.S. Pat. No. 4,261,443 also disclosing a hydraulic piston and cylinder actuator for urging a brake pad against a rotor or brake disc.

Other prior art actuation devices exist in which a flexible piston capable of axial expansion and contraction is used to effect engagement and disengagement of a brake pad from a brake disc. For example, U.S. Pat. No. 4,306,639 discloses a disc brake in which a molded, hollow expansible piston is sealingly retained in a caliper of a brake assembly. Hydraulic pressure in the interior of the piston causes axial expansion of the piston and a brake pad attached exteriorly to the piston is urged against the brake disc. A return spring in the piston is required to retract the piston when the pressure is relieved.

In U.S. Pat. No. 4,077,499 a "spring pipe" is employed which carries a brake pad on one end thereof and hydraulic pressure applied to the interior of the spring pipe causes axial expansion thereof and urges the brake pad against a rotor disc adjacent thereto. When the pressure is relieved, the spring pipe contracts and disengages the brake pad from the rotor. U.S. Pat. Nos. 3,675,743 and 3,666,059 on the other hand disclose bellows-type actuation devices having corrugated side walls that are inelastically deformable such that when extended by pressure interiorly applied to the bellows, the inelastic deformations of the walls prevents the actuators from rebounding to their original length when the pressure is relieved. In this way, the brake pad lining wear is automatically compensated for by the progressive increase in relaxed length of the bellows wall of the actuator.

Structures generally corresponding to that contemplated for use in the present invention have been known to some extent for some time for use as load supports and bearings, particularly static load bearings, thrust bearings, and like support means, in shock absorbers and other related applications. Exemplary patents disclosing structure used in devices of this type include U.S. Pat. No. 2,900,182 disclosing static load bearings constructed from layers from elastomeric material interspersed between sheets of metal and bonded together to form a stack of laminations. In this manner, a bearing is formed which has high compressive resistance and low resistance to shear forces. A cannister or retainer is used to encase the stack and prevent extrusion of the elastomeric layers when the device is compressed. Other patents to the same inventor, U.S. Pat. Nos. 3,083,065 and 3,228,673 disclose similiar devices in which laminations of elastomer and metal are used in static load bearings. The first mentioned patent discloses a laminated bearing which overcomes the problems of the earlier device of lateral bulging under compressive stress such as a columnar load, particularly in "tall" stack bearings, by preforming the layers into specific shapes. In this patent the metal layers are "contoured" to oppose uncontrolled lateral shifting. Thus, lateral force components are better contained and bulging is reduced. The latter mentioned patent, the original application of which was filed simultaneously with U.S. Pat. No. 3,083,065, is directed to solving the same problem and utilizes additional peripheral retaining means to improve the bearing resistance to the same uncontrolled lateral shifting under shear stress.

Other prior art patents which disclose similar devices, also directed to the use of the basic structure of a load support bearing of one type or another, are the following: U.S. Pat. No. 2,982,536, disclosing a load bearing in the form of a laminated spring adapted to compress under load and expand laterally; U.S. Pat. No. 3,113,769 disclosing a vehicle load support mounting device including a yieldable body between rigid sleeve members, the yieldable body subjected to torque under empty vehicle conditions and shear, compression and/or tension under loaded vehicle conditions; U.S. Pat. No. 3,377,110 disclosing an elastomer and metal sandwich-like structure for a bushing connecting oscillating elements of a track used on a track laying vehicle; U.S. Pat. No. 3,390,899 disclosing a laminated flexible rocket nozzle and/or pipe joint and bearing therefor utilizing generally the same construction; U.S. Pat. No. 2,995,907 disclosing a universal joint or shaft coupling using internested, spirally wound strips of resilient metal material, the inner and outer ends of which are respectively attached to a hub secured on one shaft and a cup secured to a connected shaft with a continuous mass of solid lubricant or elastomer filling the spaces between the surfaces of the strips; and U.S. Pat. No. 3,787,102 disclosing a load bearing made from alternate layers of elastomer and steel bonded together and contained in an outer bearing support or collar. Other patents disclosing similar devices, to round out the art, are U.S. Pat. No. 3,429,622 illustrating flexible bearings in a rocket nozzle; U.S. Pat. No. 3,690,639, illustrating a helically wound, cylindrial, torsional load bearing; U.S. Pat. No. 3,179,400 illustrating a torsion spring bearing in a wheel suspension system; and, U.S. Pat. No. 3,696,999 illustrating a flexible joint of a rocket motor nozzle.

Notwithstanding the fact that some problems attending the use of actuators of the prior art are not particularly severe, such problems as high costs relating directly to the necessity of using precision manufactured parts, the need for dynamic seals and/or seals of exotic materials in sealing systems to prevent leakage which may yet still wear prematurely and, finally, the difficulties encountered in making repairs and replacements, it has been found that there is a need for a low cost, relatively simple to manufacture device which can be easily installed and which, when used in brake assemblies and other apparatuses, machines and appliances will last throughout the life of the brake pad itself and beyond.

Owing to its novel form when used in actuator devices coupled with its relatively simple construction, the present invention inherently is easy to manufacture and assemble and provides a ready replacement means particularly as a subassembly of a main or larger assembly and requires no dynamic seals, since only a single static "O" ring seal is needed. Additional advantages include fewer parts to wear and/or fail and the elimination of separate return springs and the like.

SUMMARY OF THE INVENTION

Among the objects of the invention is to provide an actuating mechanism for apparatuses, machines and appliances and the like, which when activated by fluid pressure and the like effectuates movement of a body such as a component part of the same or another apparatus, machine or appliance into engagement with another component or element thereof.

Another object is to provide an actuating mechanism of the character referred to in which the acted upon component part or element is operatively connected to the mechanism and is axially displaced a predetermined distance to frictionally engage another member or component.

Still another object of the invention is to provide an actuating mechanism or device of the character mentioned which is endowed with elastic properties to provide reciprocating axial movement of the component part acted upon and provide engagement with and disengagement from a rotating member.

An additional object is to provide an actuating device having elastic properties of the character described which comprises a plurality of rigid and resilient members bonded together and sealingly located in bonded relation in a housing of the apparatus, machine or appliance and which when subjected to an activating medium such as fluid pressure, is capable of elastic deformation thereby effectuating axial movement of an operatively connected component part of the apparatus, machine or appliance.

Yet another object of the invention is to provide an actuator having elastic properties for use in a disc brake assembly and the like for urging a brake shoe or pad thereof into frictional engagement with a rotating disc or drum of the assembly whose rotation is to be restrained to brake a vehicle with which the assembly is associated, said actuator including its own casing and formed of concentric, annular layers of elastomer and rigid material bonded together and to the casing in sealing relation therewith, said actuator being axially deformable under shear stress causing an axial displacement of a said brake shoe or friction pad element connected to said actuator and urging said shoe or pad element into frictional engagement with said rotor or drum of said braking device.

In accomplishing these and other objects of the invention there is provided an actuator having elastic properties which, when subjected to axial stress by fluid pressure and the like acting on one side of the actuator, undergoes elastic deformation sufficient to displace a movable body such as an operatively connected brake pad of a braking system of a vehicle. The actuator is a laminated construction in which the individual laminae are resilient material members or layers interspersed with rigid material members or layers bonded together in a mold and thereafter sealingly installed by bonding in a housing of the brake system. To produce the invention, the laminae can be prepared by assembling in a mold according to the method described, for example, in co-owned U.S. Pat. No. 4,141,950 issued to the present applicant on Feb. 27, 1979 entitled, "METHOD FOR MAKING FLEXIBLE CYLINDRICAL BEARINGS", which patent is hereby incorporated by reference to the extent required for full understanding of the invention. After molding the product formed thereby is positioned in a cavity or chamber in the caliper housing of the disc brake and sealed therein by bonding. A brake pad or shoe, operatively connected or otherwise attached to the actuator is adapted thereby to be axially displaced and urged against a rotating disc or rotor, whose rotation is to be restrained, in frictional engagement therewith. Fluid or mechanical pressure supplied to the housing interior acts against the actuator which yields in axial deformation as its rigid members shift relatively to one another and to the resilient members thereby generating an axial displacement of the brake pad urging the pad into frictional engagement with the disc.

Generally speaking, the foregoing and other objects are also accomplished with this invention by providing an actuating device or actuator having a series or a plurality of alternate metal and elastomer or rubber like compound stacked, or otherwise laid upon one another in parallel relation around a core, which may be either a metal or rigid plastic member or a resilient member shaped in the form of a cup or a cylinder. The non-rigid members preferably are made of a curable compound which can be cured after assembly or stacking of the members, as in previously mentioned incorporated-by-reference U.S. Pat. No. 4,141,950, to bond all of the members together, after which an additional layer of uncured compound can be applied to the outside surface of the cured article which is thereafter located in a chamber of a casing or the like and the additional layer cured in place. After curing of this additional layer, the actuator is sealingly and fixedly located in the chamber. The actuator though fixedly positioned in the casing, when subjected to a lateral stress, as may be generated by fluid pressure supplied thereto, will nevertheless yield in elastic deformation in response to that stress, and the central core member will shift axially a predetermined distance. A movable body positioned nearby or connected to the actuator, particularly to the core member thereof will thus undergo a predetermined displacement. A particularly adaptable movable body for use with the present invention is the previously mentioned friction pad or shoe of a disc or drum braking apparatus. It will be readily appreciated, however, that the invention has many other uses not confined to braking systems. Accordingly, although the hereinafter to be described invention is presented in a light of its preferred utility as an actuator of a brake system, specifically for disc brakes, it should be apparent that it has many other applications, wherever it is desired to effect a displacement of a body, particularly when the displacement distance is relatively short and the operator controlling the action causing the displacement is located at a remote location, as in hydraulic and/or pneumatic power systems. Some such areas include, without being limited thereto, systems for opening and closing valves, coupling and uncoupling of shafts and machines, throttling and unthrottling of engines and motors, opening and closing of electrical switches and the like, and many other instances which will surely occur to the artisan using the invention.

BRIEF DESCRIPTION OF THE DRAWINGS

In the following detailed description, for a full understanding of the invention, reference should be had to the following drawings which illustrate the preferred embodiments of and the best mode presently contemplated for carrying out the invention.

FIG. 1 is a vertical section of a brake caliper housing with the invention at rest (unactuated) and operatively coupled to the friction pads of a direct-indirect, actuatable brake pad assembly;

FIG. 2 is a vertical, isometric section of a preferred embodiment of the invention separated from the caliper housing of FIG. 1;

FIG. 3 is a section taken along line 3—3 of FIG. 1;

DESCRIPTION OF THE PREFERRED EMBODIMENTS

Figure 5:
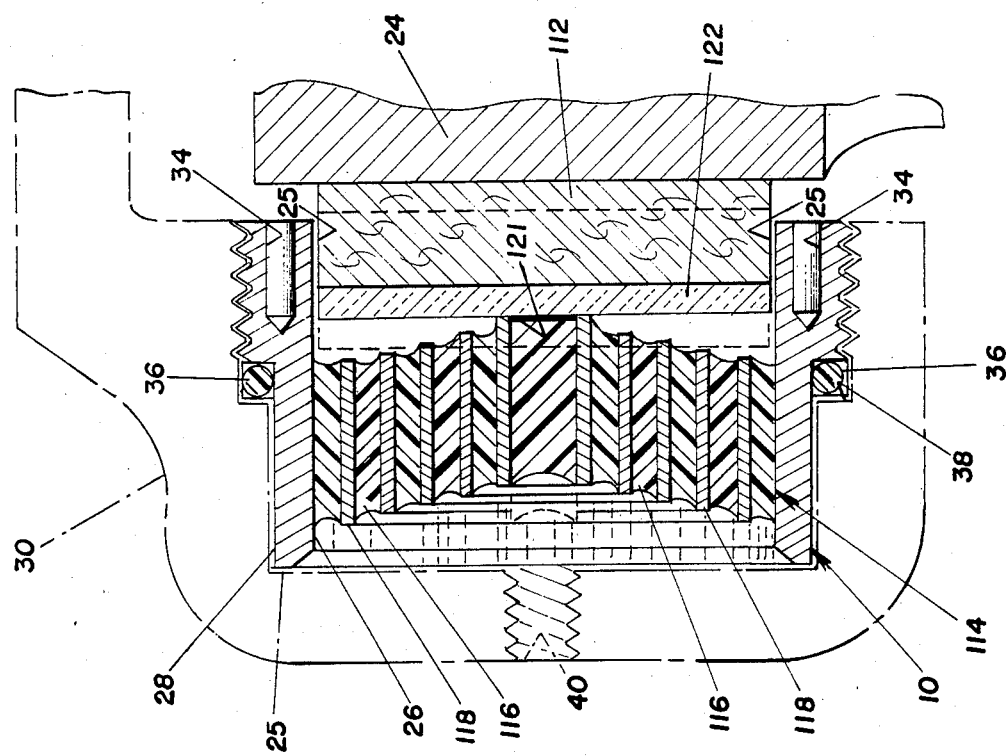
FIG. 5 is a vertical section corresponding to FIG. 1 except that the resilient core version of FIG. 4 is illustrated in its actuated condition in a brake caliper housing (shown in dash line outline) the friction pad movable body displaced and urged into engagement with the rotating rotor or brake disc; and, FIG. 6 is a vertical section of a dual brake caliper housing with a pair of the actuators of FIG. 1 employed for directly urging a pair of brake pads against a rotor or disc both actuators in actuated condition.

In FIG. 2, constituting a preferred embodiment of the invention, an actuation device or assembly 10 for displacing a movable body, as for example a friction element or brake pad 12, includes an elastically deformable actuator 14 made of a plurality of resilient and rigid members 16 and 18 respectively bonded together and to a central, rigid core member 20 being arranged in layers or laminae thereon. Core piece or member 20 preferably has a cup like shape of rigid material having a bottom side 21 to which pad 12 is operatively connected as by adhesion or bonding through an insulator layer 22 of brake pad 12. Brake pad 12 in FIG. 2, in its undisplaced, or neutral position adjacent, in normally non-contacting relation a brake disc or rotor 24 rotationally fixed to a wheel of a vehicle or other body as part of a braking system (not shown).

Actuator 14 with brake pad 12 connected or attached thereto and positioned in the opening 25, is placed in a cylindrical cavity or chamber 26 in the threadable casing 28 and fixedly located therein by bonding of outer layer 16 of resilient material, thereby providing a seal between actuator 14 and pad 12 in opening 25. In other words, the bonded together members 16 and 18 of actuator 14 are contained within cavity 26 in sealing relation with the movable body or brake pad 12.

Assembled casing 28 with actuator 14 and brake pad 12 attached thereto is installed by threading into caliper housing 30 in a recess 32 therein, using a suitable wrench or other tool fitted in the spanner holes 34 provided in casing 28 for the purpose. An internal "O" ring seal 36 disposed in a pheripheral groove 38 in housing 30 statically seals casing 28 from leakage around its outer periphery.

Figure 4:
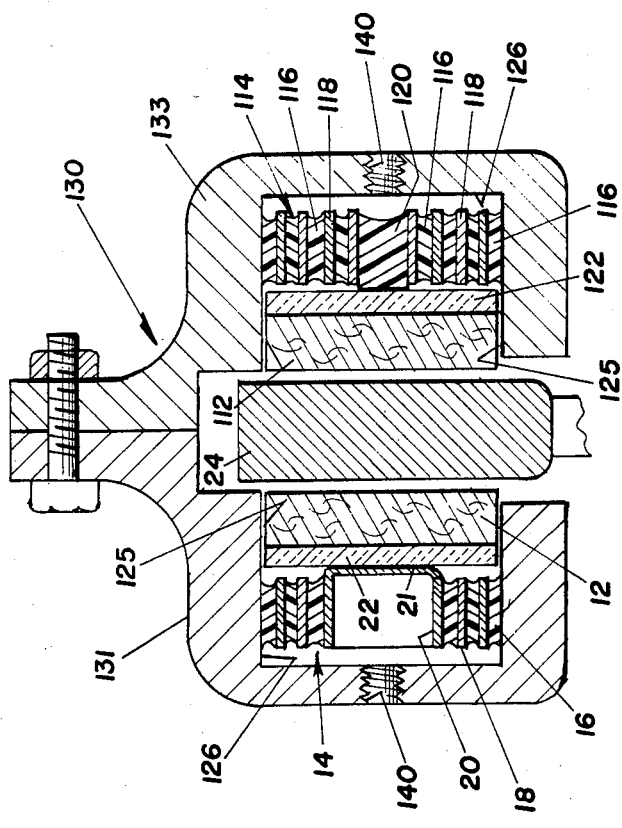
FIG. 4 is a composite, vertical section of a dual brake in a split caliper housing of a brake assembly illustrating two aspects of the invention, on the left the aspect of the invention of FIG. 1 is shown minus a casing and on the right, also minus a casing, an aspect of the invention with a resilient core member is shown, both aspects of the invention being in an at rest, unactuated condition.

FIG. 4 shows, in a composite view, a modification of the invention combined with a split caliper housing 130 for a double sided, directly actuated, dual brake assembly including a pair of brake pads 12, one (on the left) for actuation with rotor or disc 24 by previously described actuator 14 fixedly located in the left hand housing 131 of caliper 130, and the other on the right actuated by a slightly modified actuator 114 in the right hand housing 133 of caliper 130. Casing 28 has been eliminated in this embodiment, actuators 14 and 114 being bonded directly to the interior walls of the interior chambers 126 in caliper housings 131 and 133, thereby providing a sealed chamber, as before, between brake pads 12 in their housing openings 125 in both housing halves and their actuators 14 and 114 respectively. The construction of actuator 114 is basically the same as actuator 14 in that it comprises a plurality of bonded together resilient members 116 and rigid members 118 arranged in parallel relation about a central core member 120; however, in this case central core member 114 is a resilient material member having a flat end or bottom side 121 bonded or otherwise connected to insulator layer 122 of pad 112 as before. FIG. 5 shows a modified embodiment of the invention wherein actuator 114 of FIG. 4 is installed in casing 28 as in FIGS. 1 and 2 with actuator 14 and further shows actuator 114 in its actuated condition with brake pad 112 urged into engagement with rotor or disc 24 in rotational movement restraining relation therewith, caliper housing 30 shown in phantom outline.

Figure 6:
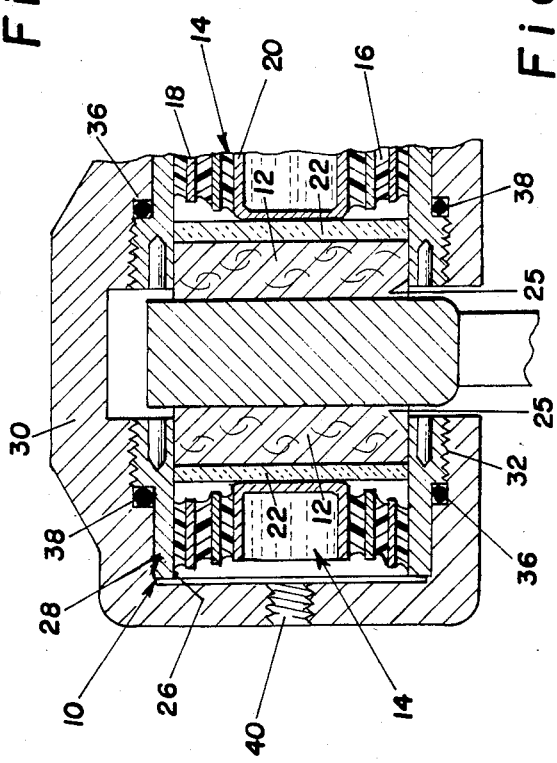

Turning now to FIG. 6, a double sided, directly actuated dual brake assembly 110 is shown utilizing a pair of brake pads 12 and actuators 14 in caliper housing 30, slightly modified to accommodate second actuator 14, further showing both actuators directly operating brake pads 12 to effect displacements thereof and urge them into engagement with rotor or disc 24 on either side thereof in rotational movement restraining engagement therewith.

In operation of the invention, reference may be had to any of FIGS. 1, 3, 4, 5 and 6. In FIG. 1 operating fluid from a source (not shown) is fed to chamber 26 (also in FIGS. 5 and 6) or to chamber 126 in FIG. 4 through the connection ports 40 or 140 in caliper housings 30 or 130 respectively pressurizing these chambers. Actuator 14 being an elastic body capable of undergoing elastic deformation under the stress of the pressure in chamber 26 will yield by axially flexing, as indicated best in FIGS. 5 and 6, causing an axial displacement of brake pad 12 or pad 112 operatively connected thereto best seen in FIG. 5 with reference to the dash line outline of brake pad 112, thereby urging these elements into frictional engagement with rotor 24 and applying a braking or rotational movement restraining force thereagainst. In FIG. 1 right hand brake pad 12 is brought into engagement with disc or rotor 24 by reaction forces acting against caliper housing 30 causing a leftward movement thereof.

Heretofore in this specification the invention has been presented in terms of its preferred utility as an actuation means for a braking system wherein a component part thereof, in particular a brake disc pad or shoe is moved into frictional engagement with a moving component of a vehicle to apply a braking force thereagainst. As described, the invention involves the creation of a multi-componented, integrated device of a plurality of resilient, parallel members interspersed with a plurality of rigid, parallel members all bonded together about a central core which may be rigid or resilient, as desired. When assembled, the layers combine to form a body which is capable of resisting radial (compression) stresses imposed in a direction tending to press the layers or members together while yielding by flexing to stress generated by axial or shear forces. Actually, however, the device is an actuator useful in any apparatus, machine or appliance in which it is desired to effect a displacement in a given direction of a movable body which may be a component member or part of that apparatus, machine or appliance or of another, separate such device. Although the preferred use presented herein is as an actuator for a disc brake assembly, the present invention has broader application being useful in any device wherein it is desired to effect a translation of a movable body displacing the same to perform some useful work on another body or device.

It will thus be readily appreciated from the foregoing description of the present invention that the best mode contemplated for producing the same has been presented and that the skilled worker in the art to which it pertains will, using only his ordinary skill, be able not only to carry out the invention in its preferred and alternate embodiments herein described, but also will be able to apply its teachings to other useful purposes such as, for example, actuation of valves and components thereof, in coupling devices, throttling devices, operation of electrical switches, contacts and other devices of like nature, gripping or holding tools such as bench and drill press vises and the like. No doubt many other uses and applications will occur to the artisan as a result of the present advance in the broad art of actuation mechanics.

Throughout the specification, the term "resilient" and "rigid" have been used in connection with the description of the invention, particularly with respect to the materials of the members making up the elastic body of the actuator. It is to be understood that by the terms "resilient" and "resilient material" is meant any material which has elastic properties of memory often characterized as having low resistance to shear stress in the sense that when so stressed it is capable of elastic deformation and whereby, owing to its memory, its unstressed shape is automatically recovered when the stress is removed. By this definition a large group of materials will be included, chief among which, without undue limitation, are the elastomers and elastomeric compounds of natural and synthetic rubber, including silicone elastomers and rubbers, butyl rubber, neoprene, some fluoroplastic compounds such as polytetrafluoroethylene, and the polyolefins, i.e., polybutylene, polyethylene, and polypropylene. Also polyurethane, particularly flexible polyurethane, is included in this class together with that class of materials known as "thermoplastic elastomers". Numerous other compounds and materials are also known which will perform as required and will occur to the skilled worker.

For the rigid materials it is preferred to use metal, it being understood that this term encompasses any of a large group of materials including, but not limited to steel, titanium, brass, aluminum, bronze, and alloys of these materials and compounds. Also included within the purview of the present invention for use as the rigid material is any of a vast number of hard, non-metallic materials characterized by high compression resistance or strength and high resistance to stretching under tensile load. Materials falling into this classification include, but are not limited to any of the rigid plastics prepared from melamine, phenolic, epoxy and furan resins, reinforced plastic materials and composites of refractory cloth impregnated with resinous materials, carbon cloth impregnated with epoxy, graphite, and fiberglass.

Materials for bonding the members together and to the caliper housing, and/or to the casing include any of the adhesives such as epoxy, melamine, formaldehyde, and the alkalated amino resins. In addition, bonding can be accomplished by using uncured curable polymeric compounds as a resilient layer cured in situ according to the method described in previously incorporated by reference U.S. Pat. No. 4,141,950. Other useful bonding agents and materials can include polyurethane and conventional rubber to metal adhesives either alone or in combination with the curable polymeric materials. Other bonding means and methods useful herein are described in the prior art patents referred to previously in this specification in connection with the description of the background of the invention.

Although the preferred embodiments of the invention have been described in specific details, it should be understood that many details may be altered without departing from the scope of the invention as it is defined within the following subtended claims.

What is claimed is:

1. A disc brake including a brake caliper housing that is substantially C-shape in section and adapted to fit over a part of the periphery and side of a brake rotor, said brake housing having a recess therein, a brake pad fixedly secured to said brake housing for engaging one face of the brake rotor, a brake pad movably carried by said brake housing in opposed relation to said first mentioned brake pad for engaging the opposed face of the brake rotor, said movably carried brake pad being carried in said recess, said recess having a closed end and an open end and having a port formed in the closed end thereof to receive fluid from a pressure source, means for moving said movably carried brake pad towards said first mentioned brake pad thereby urging said movably carried brake pad into frictional engagement with the side of said brake rotor for applying a braking force thereagainst, said means comprising an assembly fixedly secured in static sealing relation in said recess, said assembly including a cylindrical casing having a chamber and actuating means fixedly located in said chamber, said actuating means being operatively connected to said movably carried brake pad, having elastic properties, and being operative under axial stress produced thereon by fluid pressure introduced into said recess through said port to deform and thereby effect movement of said movably carried brake pad towards said first mentioned brake pad, said actuating means having a circular cross section and a central core and being comprised of rigid and resilient members bonded together in substantially parallel relation about an axis corresponding to the direction of said stress and adapted thereby to yield by flexing under said stress producing said movement of said movably carried brake pad and to resist said flexing under compressive stress, said members being concentric about said core with the innermost and outermost members being resilient and bonded, respectively, to said core and to said casing, said actuating means causing a return of said movably carried brake pad to substantially an initial position thereof upon release of the fluid pressue introduced into said recess through said port.

2. A disc brake according to claim 1 wherein said core is rigid and has a cup like shape with the opening thereof exposed to the fluid pressure introduced into said recess through said port and with a bottom to which said movably carried brake pad is operatively connected by bonding.

3. A disc brake including a brake caliper housing that is substantially C-shape in section and adapted to fit over a part of the periphery and sides of a brake rotor, said brake housing having a recess therein, a brake pad secured to said brake housing for engaging one face of a brake rotor, a brake pad movably carried by said brake housing in opposed relation to said first mentioned brake pad for engaging the opposed face of the brake rotor, said movably carried brake pad being carried in said recess, said recess having a closed end and an open end and having a port formed in its closed end to receive fluid from a pressure source, means for moving said movably carried brake pad to urge it towards said first mentioned brake pad comprising actuator means operatively connected to said movably carried brake pad, said actuator means having elastic properties and being operative under axial stress produced thereon by a fluid pressure applied thereto through said port to effect a displacement of said movably carried brake pad, said actuator means being comprised of rigid and resilient members bonded together in substantially parallel relation about an axis corresponding to the direction of stress and adapted to yield by flexing under said stress producing said displacement of said movably carried brake pad and to resist said flexing under compressive stress, and further including means for containing said bonded together members fixedly secured in said recess in static sealing relation with said movably carried brake pad.

4. A brake disc according to claim 3 wherein said further included means is a casing and said bonded members are bonded to an inner surface thereof for sealing said members from said movably carried brake pad.

5. A disc brake according to claim 1, wherein reaction forces acting against said brake housing urges said first mentioned brake pad into engagement with the brake rotor for applying a braking force thereagainst upon movement by said means for moving of said movable carried brake pad towards said first mentioned brake pad.

6. A disk brake including a pair of opposed caliper housings each of which is substantially C-shape in section and is adapted to fit over a part of the periphery and a respectively associated side of a brake rotor, a first brake pad movably carried by one of said opposed caliper housings for engaging one face of the brake rotor, a second brake pad movably carried by the other of said opposed caliper housings in opposed relationship to said first brake pad for engaging the opposed face of the brake rotor, each of said opposed caliper housings having a recess formed therein with each of said recesses having a closed end and an open end and having a port formed in the closed end thereof, the open ends of said recesses facing each other, said first brake pad being carried in one of said recesses and said second brake pad being carried in the other one of said recesses, and means for moving said first and said second brake pads toward each other thereby urging said brake pads into frictional engagement with the associated side of said rotor for applying a braking force thereagainst, said means comprising a first assembly fixedly secured in sealing relationship in one of said recesses and a second assembly fixedly secured in sealing relationship in the other of said recesses, each of said assemblies including a cylindrical casing having a chamber and actuating means fixedly located in said chamber, said actuating means having elastic properties and being operative under axial stress produced thereon by fluid pressure introduced into the port of the associated recess to deform and thereby effect movement of the associated brake pad toward the other one of said brake pads, said actuating means having a circular cross section and a central core and being comprised of rigid and resilient members bonded together in substantially parallel relationship about and axis corresponding to the direction of stress and adapted thereby to yield by flexing under said stress producing said movement of the associated brake pad and to resist said flexing under compressive stress, said members being concentric about said core with the innermost and outermost members being resilient and bonded, respectively, to said core and to said casing, said actuating means causing a return of said associated movably carried brake pad to substantially an initial position thereof upon release of the fluid pressure introduced into the associated recess through the port thereof.

* * * * *